US011879267B2

(12) United States Patent
Dong et al.

(10) Patent No.: US 11,879,267 B2
(45) Date of Patent: Jan. 23, 2024

(54) DOOR LOCK SHIELDING COVER

(71) Applicant: GREE ELECTRIC APPLIANCES, INC. OF ZHUHAI, Guangdong (CN)

(72) Inventors: Mingzhu Dong, Zhuhai (CN); Jianming Tan, Zhuhai (CN); Shaobin Li, Zhuhai (CN); Dechao Song, Zhuhai (CN); Daoyuan Chen, Zhuhai (CN); Ruilong Zhou, Zhuhai (CN)

(73) Assignee: GREE ELECTRIC APPLIANCES, INC. OF ZHUHAI, Guangdon (CN)

( * ) Notice: Subject to any disclaimer, the term of this patent is extended or adjusted under 35 U.S.C. 154(b) by 360 days.

(21) Appl. No.: 17/598,283

(22) PCT Filed: Sep. 30, 2019

(86) PCT No.: PCT/CN2019/109304

§ 371 (c)(1),
(2) Date: Sep. 26, 2021

(87) PCT Pub. No.: WO2020/192068

PCT Pub. Date: Oct. 1, 2020

(65) Prior Publication Data

US 2022/0178165 A1 Jun. 9, 2022

(30) Foreign Application Priority Data

Mar. 26, 2019 (CN) ......................... 201910231526.3

(51) Int. Cl.
*E05B 17/18* (2006.01)

(52) U.S. Cl.
CPC .................................. *E05B 17/185* (2013.01)

(58) Field of Classification Search
CPC ......... E05B 17/18; E05B 17/185; E05B 17/14
See application file for complete search history.

(56) References Cited

U.S. PATENT DOCUMENTS 4,674,308 A * 6/1987 Peters .................... E05B 17/185 70/423
5,680,095 A * 10/1997 Nassouri ................. E05B 17/18 70/427

(Continued)

FOREIGN PATENT DOCUMENTS

CN 202645151 U 1/2013
CN 204163487 U 2/2015

(Continued)

*Primary Examiner* — Christopher J Boswell

(74) *Attorney, Agent, or Firm* — J. Miguel Hernandez; James R. Gourley; Carstens, Allen & Gourley, LLP

(57) ABSTRACT

Door lock shielding cover, which includes a shielding cover body, an attraction member, and blocking portions. The shielding cover body is configured to be movably installed onto a lock panel of a smart door lock. The attraction member is installed on a side of the shielding cover body adjacent to the lock panel of the smart door lock. A plurality of through holes is defined in the attraction member. The blocking portions correspond to the through holes in a one-to-one manner. Each of the blocking portions is fixed to the shielding cover body through a connecting portion that penetrates the through hole, thereby fixing the attraction member to the shielding cover body. The fixing between the shielding cover body and the attraction member in the door lock shielding cover is firm and durable.

15 Claims, 2 Drawing Sheets

(56) References Cited

U.S. PATENT DOCUMENTS

| | | | | | |
|---|---|---|---|---|---|
| 5,718,137 | A * | 2/1998 | Huston | E05B 17/185 | 70/423 |
| 5,904,385 | A * | 5/1999 | Linder | E05B 17/185 | 292/DIG. 31 |
| 6,154,271 | A * | 11/2000 | Duc | E05B 17/185 | 396/536 |
| 7,401,484 | B1 * | 7/2008 | Holmes | E05B 17/185 | 70/423 |
| 7,621,161 | B2 * | 11/2009 | Fontana | E05B 17/142 | 70/276 |
| 10,934,745 | B2 * | 3/2021 | Liu | E05B 17/185 | |
| 2023/0279695 | A1 * | 9/2023 | Li | E05B 17/18 | 70/275 |

FOREIGN PATENT DOCUMENTS

| | | | | |
|---|---|---|---|---|
| CN | 204199874 | U | 3/2015 | |
| CN | 207245357 | U | 4/2018 | |
| CN | 207315019 | U | 5/2018 | |
| CN | 207453665 | U | 6/2018 | |
| CN | 108442817 | A | 8/2018 | |
| CN | 207700861 | U | 8/2018 | |
| CN | 207739762 | U | 8/2018 | |
| CN | 208267567 | U | 12/2018 | |
| CN | 109763701 | A | 5/2019 | |
| DE | 20016845 | U1 * | 11/2000 | E05B 17/147 |
| DE | 20103571 | U1 * | 6/2001 | E05B 17/186 |
| EP | 2096237 | A2 | 9/2009 | |
| JP | 2005273189 | A | 10/2005 | |
| JP | 2009019469 | A | 1/2009 | |

* cited by examiner

DOOR LOCK SHIELDING COVER

CROSS-REFERENCE TO RELATED APPLICATION

This application is a U.S. National Stage of International Application No. PCT/CN2019/109304, filed on Sep. 30, 2019, and published as WO 2020/192068 A1 on Oct. 1, 2020, which claims priority of China Patent Application No. 201910231526.3, filed on Mar. 26, 2019, entitled "DOOR LOCK SHIELDING COVER", the content of which is hereby incorporated by reference in its entirety. Every patent application and publication listed in this paragraph is hereby incorporated by reference in its entirety as an example.

TECHNICAL FIELD

The present disclosure relates to the field of smart home technology, and in particular to a door lock shielding cover.

BACKGROUND

Smart door locks play an important role in the field of smart home technology. Life has become more and more convenient because of the gradual popularity of the smart door locks. The shielding cover for the emergency keyhole in the smart door lock includes a plastic shielding cover panel and an iron attraction member. The attraction member is fixed on the shielding cover panel. One end of the shielding cover panel is connected to the lock panel of the smart door lock through a screw column, and another end of the shielding cover panel is attracted and secured to the lock panel of the smart door lock through the attraction member. The attraction member and the lock panel are secured together by magnetic attraction. In related art, the plastic shielding cover panel and the iron attraction member are glued together.

SUMMARY

The present disclosure provides a door lock shielding cover.

A door lock shielding cover includes a shielding cover body, an attraction member, and blocking portions.

The shielding cover body is configured to be movably installed onto a lock panel of a smart door lock.

The attraction member is installed on a side of the shielding cover body adjacent to the lock panel of the smart door lock, and is configured to attract the shielding cover body to the lock panel of the smart door lock. A plurality of through holes is defined in the attraction member.

The blocking portions correspond to the through holes in a one-to-one manner. Each of the blocking portions is fixed to the shielding cover body through a connecting portion that penetrates the through hole, thereby fixing the attraction member to the shielding cover body.

The above-described door lock shielding cover includes the shielding cover body, the attraction member installed on the shielding cover body, the connecting portions, and the blocking portions. The connecting portions and the blocking portions are configured to connect the shielding cover body with the attraction member. The shielding cover body is to be movably installed onto the lock panel of the smart door lock. The shielding cover body in a shielding position covers the emergency keyhole of the smart door lock. When the shielding cover body is in other positions, the emergency keyhole is exposed for unlocking the smart door lock by using an emergency key. The shielding cover body is secured to the lock panel of the smart door lock by the attraction member. When the attraction member is attracted to the lock panel of the smart door lock, the shielding cover body is located in the shielding position. When the attraction member is not attracted to the lock panel of the smart door lock, the shielding cover body is located in other positions. The shielding cover body and the attraction member are fixed by the connecting portions and the blocking portions. The multiple through holes are defined in the attraction member. The blocking portions corresponding to the through holes in the one-to-one manner are disposed on the side of the attraction member away from the shielding cover body. Each blocking portion is fixed to the shielding cover through the connecting portion penetrating through the through hole. The connecting portion is located on the surface of the shielding cover body at the side facing the lock panel of the smart door lock. In the process of installing the attraction member, the through holes of the attraction member are positioned corresponding to the connecting portions, and the connecting portions passing through the through holes are connected to the blocking portions, thereby limiting the position of the attraction member between the shielding cover body and the multiple blocking portions in order to achieve a fixed connection between the attraction member and the shielding cover body. The above-described door lock shielding cover adopts the connecting portions and the blocking portions to limit the position of the attraction member between the shielding cover body and the blocking portions. This fixing manner is firmer compared with the glue bonding method that is not secure and endurable due to material difference between the cover body and the attraction member. This fixing manner between the shielding cover body and the attraction member in the door lock shielding cover is not restricted by the materials thereof, and the firmness of the fixation between the shielding cover body and the attraction member can be ensured.

In an embodiment, the shielding cover body is made of a plastic material; the shielding cover body, the connecting portion, and the blocking portion are integrated together as one piece.

In an embodiment, the through holes are counterbores, and a diameter of an end of the counterbores adjacent to the shielding cover body is smaller than a diameter of another end of the counterbores away from the shielding cover body; the blocking portions are located at the end of the counterbores away from the shielding cover body.

In an embodiment, the shielding cover body is movably installed on the lock panel of the smart door lock through the screw column.

In an embodiment, the screw column is located on the shielding cover body and integrated with the shielding cover body as one piece.

In an embodiment, the attraction member is located beside the screw column; a portion of the shielding cover body corresponding to the attraction member is provided with a recess, the attraction member is disposed in the recess; and a surface of the attraction member away from a bottom surface of the recess is flush with a surface of the shielding cover body facing the lock panel.

In an embodiment, the attraction member is provided with one through hole for the screw column to pass through; the attraction member covers a surface of the shielding cover body facing the lock panel; a surface of the attraction member away from the shielding cover body is a flat surface.

In an embodiment, the attraction member is located beside the screw column, and a surface of the attraction member facing the lock panel is higher than a surface of the shielding cover body facing the lock panel.

In an embodiment, the attraction member is provided with one through hole for the screw column to pass through; the attraction member covers a surface of the shielding cover body facing the lock panel; a portion, located at one side of the screw column, of a surface of the attraction member away from the shielding cover body is lower than another portion, located at another side of the screw column, of the surface of the attraction member away from the shielding cover body.

In an embodiment, the screw column is located on the attraction member and located at a side of the attraction member away from the shielding cover body; the screw column is integrated with the attraction member as one piece.

In an embodiment, an end of the attraction member having the screw column located thereon is away from an edge of the shielding cover body; a portion of the shielding cover body corresponding to the attraction member is provided with a recess; the attraction member is disposed in the recess; a surface of the attraction member away from the bottom surface of the recess is flush with a surface of the shielding cover body facing the lock panel.

In an embodiment, the attraction member covers a surface of the shielding cover body facing the lock panel; except a portion with the screw column, a surface of the attraction member away from the shielding cover body is a flat surface.

In an embodiment, an end of the attraction member having the screw column located thereon is away from an edge of the shielding cover body; and a surface of the attraction member facing the lock panel is higher than a surface of the shielding cover body facing the lock panel.

In an embodiment, the attraction member covers a surface of the shielding cover body facing the lock panel; a portion, located at one side of the screw column, of a surface of the attraction member away from the shielding cover body is lower than another portion, located at another side of the screw column, of a surface of the attraction member away from the shielding cover body.

DETAILED DESCRIPTION

Figure 1:
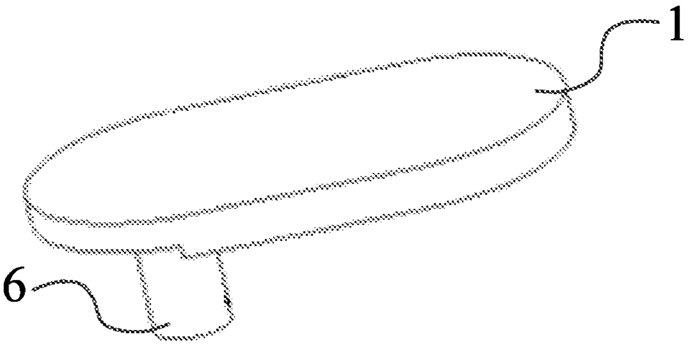
FIG. 1 is a schematic structural view from one side of a shielding cover body of a door lock shielding cover provided in an embodiment of the present disclosure.

In order to facilitate the understanding of the present disclosure, the present disclosure will be comprehensively described with reference to the drawings. Embodiments of the disclosure are shown in the accompanying drawings. However, the present disclosure can be implemented in many different forms and therefore is not limited to the embodiments described herein. On the contrary, the purpose of providing these embodiments is to make the understanding of the present disclosure more thorough and comprehensive.

Referring to FIG. 1 to FIG. 6, the present disclosure provides a door lock shielding cover, including a shielding cover body 1, an attraction member 2, and blocking portions 4.

The shielding cover body 1 is to be movably installed onto a lock panel of a smart door lock. The attraction member 2 is installed on a side of the shielding cover body 1 adjacent to the lock panel of the smart door lock, and is configured to attach the shielding cover body 1 to the lock panel of the smart door lock by attraction. Multiple through holes 3 are defined in the attraction member 2. The blocking portions 4 correspond to the through holes 3 in a one-to-one manner. Each blocking portion 4 is fixed to the shielding cover body 1 through a connecting portion 5 that penetrates the through hole 3, thereby fixing the attraction member 2 to the shielding cover body 1.

The above-described door lock shielding cover includes the shielding cover body 1, the attraction member 2 installed on the shielding cover body 1, the connecting portions 5, and the blocking portions 4. The connecting portions 5 and the blocking portions 4 are configured to connect the shielding cover body 1 with the attraction member 2. The shielding cover body 1 is to be movably installed onto the lock panel of the smart door lock. The shielding cover body 1 in a shielding position covers the emergency keyhole of the smart door lock. When the shielding cover body 1 is in other positions, the emergency keyhole is exposed for unlocking the smart door lock by using an emergency key. The shielding cover body 1 is secured to the lock panel of the smart door lock by the attraction member 2. When the attraction member 2 is attracted to the lock panel of the smart door lock, the shielding cover body 1 is located in the shielding position. When the attraction member 2 is not attracted to the lock panel of the smart door lock, the shielding cover body 1 is located in other positions. The shielding cover body 1 and the attraction member 2 are fixed by the connecting portions 5 and the blocking portions 4. The multiple through holes 3 are defined in the attraction member 2. The blocking portions 4 corresponding to the through holes 3 in the one-to-one manner are disposed on the side of the attraction member 2 away from the shielding cover body 1. Each blocking portion 4 is fixed to the shielding cover through the connecting portion 5 penetrating through the through hole 3. The connecting portion 5 is located on the surface of the shielding cover body 1 at the side facing the lock panel of the smart door lock. In the process of installing the attraction member 2, the through holes 3 of the attraction member 2 are positioned corresponding to the connecting portions 5, and the connecting portions 5 passing through the through holes 3 are connected to the blocking portions 4, thereby limiting the position of the attraction member 2 between the shielding cover body 1 and the multiple blocking portions 4 in order to achieve a fixed connection between the attraction member 2 and the shielding cover body 1. The above-described door lock shielding cover adopts the connecting portions 5 and the blocking portions 4 to limit the position of the attraction member 2 between the shielding cover body 1 and the blocking portions 4. This fixing manner is firmer compared with the glue bonding method that is not secure and endurable due to material difference between the cover body 1 and the attraction member 2. This fixing manner between the shielding cover body 1 and the attraction member 2 in the door lock shielding cover is not restricted by the materials thereof, and the firmness of the fixation between the shielding cover body 1 and the attraction member 2 can be ensured.

The attraction member 2 can be made of iron. A magnet can be arranged in the lock panel of the smart door lock at the region around the emergency keyhole. The attraction member 2 is secured to the magnet through the magnetic attraction. When the attraction member 2 is attracted to the magnet, the shielding cover body 1 is located at the shielding position to shield the emergency keyhole.

Figure 5:
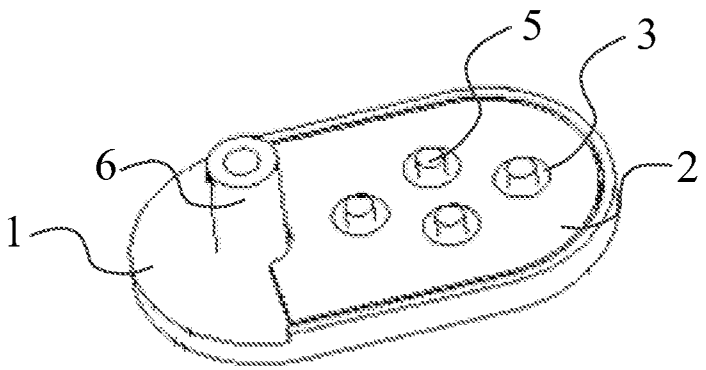
FIG. 5 is a schematic structural view of the door lock shielding cover with the attraction member placed in an attraction member installation area provided in an embodiment of the present disclosure.
Figure 6:
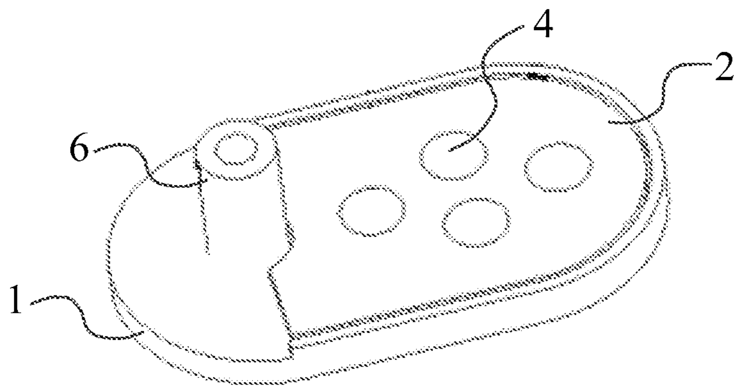
FIG. 6 is a schematic structural view of the door lock shielding cover with the attraction member fixed to the shielding cover body provided in an embodiment of the present disclosure.

Referring to FIG. 5 and FIG. 6, in an embodiment, the shielding cover body 1 is made of a plastic material, and the shielding cover body 1, the connecting portion 5, and the blocking portion 4 are integrated together as one piece.

In an embodiment, in the above-described door lock shielding cover, the shielding cover body 1 is made of the plastic material, and the shielding cover body 1, the connecting portion 5, and the blocking portion 4 are integrated together as one piece. During the manufacturing process, the shielding cover body 1 is integrated formed with the connecting portion 5 as one piece. In installation of the attraction member 2 onto the shielding cover body 1, each connecting portion 5 passes through one through hole 3 corresponding to the connecting portion 5. The length of the connecting portion 5 is greater than the thickness of the attraction member 2. Then the end of the connecting portion 5 away from the shielding cover body 1 is thermally melted to form the blocking portion 4 on the side of the attraction member 2 away from the shielding cover body 1. The length of the connecting portion 5 can be designed according to actual needs.

Figure 3:
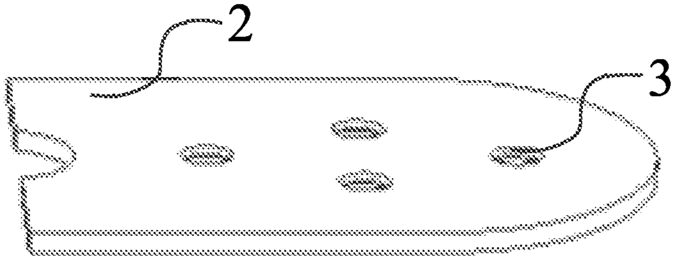
FIG. 3 is a schematic structural view from one side of an attraction member of the door lock shielding cover provided in an embodiment of the present disclosure.
Figure 4:
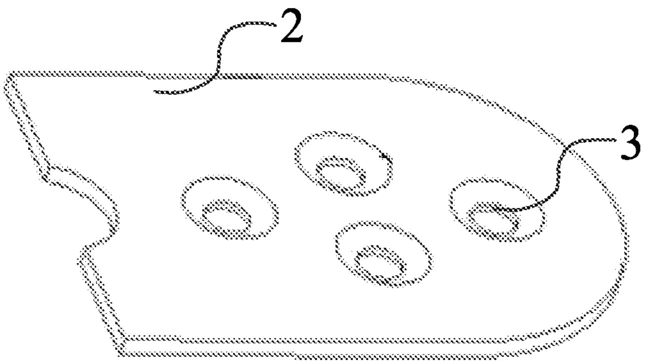
FIG. 4 is a schematic structural view from another side of the attraction member of the door lock shielding cover provided in an embodiment of the present disclosure.

In an embodiment, as shown in FIG. 3 and FIG. 4, the through holes 3 are counterbores. The diameter of the end of the counterbore adjacent to the shielding cover body 1 is smaller than the diameter of the other end of the counterbore away from the shielding cover body 1. The blocking portion 4 is located at the end of the counterbore away from the shielding cover body 1.

The through holes 3 in the attraction member 2 are counterbores, so that the blocking portions 4, formed from the thermal melting process of the ends, away from the shielding cover body 1, of the connecting portions 5, are located in the counterbores; the blocking portions 4 are flush with the surface of the attraction member 2, thus avoiding abrasion of a protruding blocking portion 4, increasing the firmness of the fixation, and ensuring the smoothness of the appearance as well.

In the above-described door lock shielding cover, the number of the connecting portions 5 can be increased or decreased according to actual needs; the length of the connecting portions 5 can be designed according to the size of the counterbores, so that the blocking portions 4 are completely located in the counterbores and flush with the surface of the attraction member 2. The size and length of the connecting portions 5 can also be determined according to actual needs.

In an embodiment, as shown in FIG. 5 and FIG. 6, the shielding cover body 1 is to be movably installed onto the lock panel of the smart door lock through a screw column 6.

The shielding cover body 1 is movably installed on the lock panel of the smart door lock through the screw column 6, so that the shielding cover body 1 can be switched between the shielding position and other positions.

In an embodiment, as shown in FIG. 1, the screw column 6 is formed on the shielding cover body 1 and integrated with the shielding cover body 1 as one piece.

In an embodiment, the screw column 6 is formed on the shielding cover body 1, and the screw column 6 is located at the side of the shielding cover body 1 adjacent to the lock panel. One end of the screw column 6 is fixed to the shielding cover body 1, and the other end of the screw column 6 extends into the lock panel to engage with a nut. A section of the screw column 6 is left between the shielding cover body 1 and the nut to realize the rotation of the shielding cover body 1 and the screw column 6 around the axis of screw column 6. Thus, the shielding cover body 1 can be switched between the shielding position and other positions. The screw column 6 and the shielding cover body 1 are formed by one molding process, and are not needed to be further assembled together, which saves time and avoids loose fixation between the screw column 6 and the shielding cover body 1.

In an embodiment, the attraction member 2 is located beside the screw column 6. A portion of the shielding cover body 1 corresponding to the attraction member 2 is provided with a recess. The attraction member 2 is disposed in the recess. The surface of the attraction member 2 away from the bottom surface of the recess is flush with the surface of the shielding cover body 1 facing the lock panel.

In an embodiment, the attraction member 2 is provided with one through hole 3 for the screw column 6 to pass through. The attraction member 2 covers the surface of the shielding cover body 1 facing the lock panel. The surface of the attraction member 2 away from the shielding cover body 1 is a flat surface.

When the screw column 6 is formed on the shielding cover body 1, in a first embodiment, the attraction member 2 is located beside the screw column 6. A portion of the shielding cover body 1 corresponding to the attraction member 2 is provided with a recess. The attraction member 2 is disposed in the recess. The surface of the attraction member 2 away from the bottom surface of the recess is flush with the surface of the shielding cover body 1 facing the lock panel. In a second embodiment, the attraction member 2 is provided with the through hole 3 for the screw column 6 to pass through. The attraction member 2 covers the surface of the shielding cover body 1 facing the lock panel. The surface of the attraction member 2 away from the shielding cover body 1 is a flat surface. In the above two embodiments, in use, the shielding cover body 1 can be manually moved to release the attraction between the attraction member 2 and the lock panel, and the shielding cover body 1 can be rotated to switch between the shielding position and other positions.

In an embodiment, as shown in FIG. 5, the attraction member 2 is located beside the screw column 6, and the surface of the attraction member 2 facing the lock panel is higher than the surface of the shielding cover body 1 facing the lock panel.

In an embodiment, the attraction member 2 is provided with one through hole 3 for the screw column 6 to pass through. The attraction member 2 covers the surface of the shielding cover body 1 facing the lock panel. A portion, located at one side of the screw column 6, of the surface of the attraction member 2 away from the shielding cover body 1 is lower than another portion, located at the other side of the screw column 6, of the surface of the attraction member 2 away from the shielding cover body 1.

When the screw column 6 is formed on the shielding cover body 1, in a third embodiment, the attraction member 2 is located beside the screw column 6, and the surface of the attraction member 2 facing the lock panel is higher than the surface of the shielding cover body 1 facing the lock panel. In use, the attraction between the attraction member 2 and the lock panel can be released by pressing the end of shielding cover body 1 away from the attraction member 2, and then the shielding cover body 1 can be rotated to switch between the shielding position and other positions. In a fourth embodiment, the attraction member 2 is provided with one through hole 3 for the screw column 6 to pass through. The attraction member 2 covers the surface of shielding cover body 1 facing the lock panel. A portion, located at one side of the screw column 6, of the surface of the attraction member 2 away from the shielding cover body 1 is lower than another portion, located at the other side of the screw column 6, of the surface of the attraction member 2 away from the shielding cover body 1. In use, the attraction between the attraction member 2 and the lock panel can be released by pressing the portion of the shielding cover body 1 corresponding to the lower side of the attraction member 2, and then the shielding cover body 1 can be rotated to switch between the shielding position and other positions.

In an embodiment, the screw column 6 is formed on the attraction member 2 and located at the side of the attraction member 2 away from the shielding cover body 1. The screw column 6 is integrated with the attraction member 2 as one piece.

In an embodiment, the screw column 6 is formed on the attraction member 2. One end of the screw column 6 is fixed to the attraction member 2, and the other end of the screw column 6 extends into the lock panel to engage with a nut. A section of the screw column 6 is left between the attraction member 2 and the nut to realize the rotation of the screw column 6, the attraction member 2, and the shielding cover body 1 around the axis of the screw column 6, so as to realize the switching of the shielding cover body 1 between the shielding position and other positions. The screw column 6 and the attraction member 2 are formed by one molding process, and are not needed to be further assembled together, which saves time and avoids loose fixation between the screw column 6 and the attraction member 2.

In an embodiment, the end of the attraction member 2 having the screw column 6 located thereon is away from the edge of the shielding cover body 1. The portion of the shielding cover body 1 corresponding to the attraction member 2 is provided with a recess. The attraction member 2 is disposed in the recess. The surface of the attraction member 2 away from the bottom surface of the recess is flush with the surface of the shielding cover body 1 facing the lock panel.

In an embodiment, the attraction member 2 covers the surface of the shielding cover body 1 facing the lock panel. Except the portion with the screw column 6, the surface of the attraction member 2 away from the shielding cover body 1 is a flat surface.

When the screw column 6 is formed on the attraction member 2, in a first embodiment, the end of the attraction member 2 having the screw column 6 located thereon is away from the edge of the shielding cover body 1. The portion of the shielding cover body 1 corresponding to the attraction member 2 is provided with a recess. The attraction member 2 is disposed in the recess. The surface of the attraction member 2 away from the bottom surface of the recess is flush with the surface of the shielding cover body 1 facing the lock panel. In a second embodiment, the attraction member 2 covers the surface of the shielding cover body 1 facing the lock panel. Except the portion with the screw column 6, the surface of the attraction member 2 away from the shielding cover body 1 is a flat surface. In use, the shielding cover body 1 can be manually moved to release the attraction between the attraction member 2 and the lock panel, so that the shielding cover body 1 can be rotated to switch between the shielding position and other positions.

In an embodiment, the end of the attraction member 2 having the screw column 6 located thereon is away from the edge of the shielding cover body 1, and the surface of the attraction member 2 facing the lock panel is higher than the surface of the shielding cover body 1 facing the lock panel.

In an embodiment, the attraction member 2 covers the surface of the shielding cover body 1 facing the lock panel; a portion, located at one side of the screw column 6, of the surface of the attraction member 2 away from the shielding cover body 1 is lower than another portion, located at the other side of the screw column 6, of the surface of the attraction member 2 away from the shielding cover body 1.

When the screw column 6 is formed on the attraction member 2, in a third embodiment, the end of the attraction member 2 having the screw column 6 located thereon is away from the edge of the shielding cover body 1, and the surface of the attraction member 2 facing the lock panel is higher than the surface of the shielding cover body 1 facing the lock panel. In use, the attraction between the attraction member 2 and the lock panel can be released by pressing the end of shielding cover body 1 away from the attraction member 2, and then the shielding cover body 1 can be rotated to switch between the shielding position and other positions. In a fourth embodiment, the attraction member 2 covers the surface of the shielding cover body 1 facing the lock panel; a portion, located at one side of the screw column 6, of the surface of the attraction member 2 away from the shielding cover body 1 is lower than another portion, located at the other side of the screw column 6, of the surface of the attraction member 2 away from the shielding cover body 1. In use, the attraction between the attraction member 2 and the lock panel can be released by pressing the portion of the shielding cover body 1 corresponding to the lower side of the attraction member 2, and then the shielding cover body 1 can be rotated to switch between the shielding position and other positions.

Figure 2:
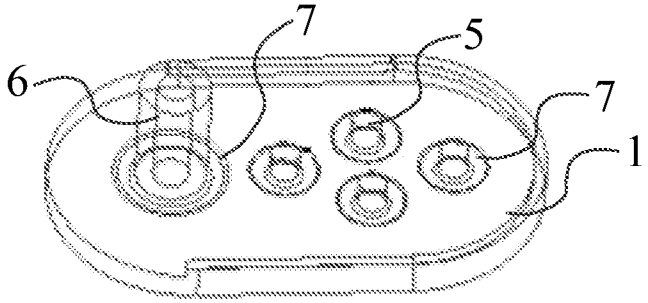
FIG. 2 is a schematic structural view from another side of the shielding cover body of the door lock shielding cover provided in an embodiment of the present disclosure.

In an embodiment, as shown in FIG. 2, grooves 7 are provided respectively surrounding the connecting portions 5 and the screw column 6.

In the above-described door lock shielding cover, the shielding cover body 1 and the attraction member 2 are fixed by the connecting portions 5 and the blocking portions 4. Before this process, the attraction member 2 and the shielding cover body 1 can be preliminarily fixed by glue, which can strengthen the firmness of the fixation. To solve the problem of partial shrinkage of the shielding cover body 1 made of the plastic material due to the relatively thick glue around the connecting portions 5 and the screw column 6, the grooves 7 are defined surrounding the connecting portions 5 and the screw column 6, which effectively solves the shrinkage problem.

The technical features of the above-mentioned embodiments can be combined arbitrarily. In order to make the description concise, not all possible combinations of the technical features are described in the embodiments. However, as long as there is no contradiction in the combination of these technical features, the combinations should be considered as in the scope of the present disclosure.

The above-described embodiments are only several implementations of the present disclosure, and the descriptions are relatively specific and detailed, but they should not be construed as limiting the scope of the present disclosure. It should be understood by those of ordinary skill in the art that various modifications and improvements can be made without departing from the concept of the present disclosure, and all fall within the protection scope of the present disclosure. Therefore, the patent protection of the present disclosure shall be defined by the appended claims.

What is claimed is:

1. A door lock shielding cover comprising:

a shielding cover body configured to be movably installed onto a lock panel of a smart door lock;

an attraction member installed on a side of the shielding cover body adjacent to the lock panel of the smart door lock, and configured to attract the shielding cover body to the lock panel of the smart door lock, a plurality of through holes being defined in the attraction member;

blocking portions corresponding to the through holes in a one-to-one manner, each of the blocking portions being fixed to the shielding cover body through a connecting portion that penetrates the through hole, thereby fixing the attraction member to the shielding cover body.

2. The door lock shielding cover of claim 1, wherein the shielding cover body is made of a plastic material; the shielding cover body, the connecting portion, and the blocking portion are integrated together as one piece.

3. The door lock shielding cover of claim 2, wherein the through holes are counterbores, and a diameter of an end of the counterbores adjacent to the shielding cover body is smaller than a diameter of another end of the counterbores away from the shielding cover body; the blocking portions are located at the end of the counterbores away from the shielding cover body.

4. The door lock shielding cover of claim 1, further comprising a screw column, wherein the shielding cover body is movably installed on the lock panel of the smart door lock through the screw column.

5. The door lock shielding cover of claim 4, wherein the screw column is located on the shielding cover body and integrated with the shielding cover body as one piece.

6. The door lock shielding cover of claim 5, wherein the attraction member is located beside the screw column; a portion of the shielding cover body corresponding to the attraction member is provided with a recess, the attraction member is disposed in the recess; and a surface of the attraction member away from a bottom surface of the recess is flush with a surface of the shielding cover body facing the lock panel.

7. The door lock shielding cover of claim 5, wherein the attraction member is provided with one through hole for the screw column to pass through; the attraction member covers a surface of the shielding cover body facing the lock panel; a surface of the attraction member away from the shielding cover body is a flat surface.

8. The door lock shielding cover of claim 5, wherein the attraction member is located beside the screw column, and a surface of the attraction member facing the lock panel is higher than a surface of the shielding cover body facing the lock panel.

9. The door lock shielding cover of claim 5, wherein the attraction member is provided with one through hole for the screw column to pass through; the attraction member covers a surface of the shielding cover body facing the lock panel; a portion, located at one side of the screw column, of a surface of the attraction member away from the shielding cover body is lower than another portion, located at another side of the screw column, of the surface of the attraction member away from the shielding cover body.

10. The door lock shielding cover of claim 4, wherein the screw column is located on the attraction member and located at a side of the attraction member away from the shielding cover body; the screw column is integrated with the attraction member as one piece.

11. The door lock shielding cover of claim 10, wherein an end of the attraction member having the screw column located thereon is away from an edge of the shielding cover body; a portion of the shielding cover body corresponding to the attraction member is provided with a recess; the attraction member is disposed in the recess; a surface of the attraction member away from a bottom surface of the recess is flush with a surface of the shielding cover body facing the lock panel.

12. The door lock shielding cover of claim 10, wherein the attraction member covers a surface of the shielding cover body facing the lock panel; except a portion with the screw column, a surface of the attraction member away from the shielding cover body is a flat surface.

13. The door lock shielding cover of claim 10, wherein an end of the attraction member having the screw column located thereon is away from an edge of the shielding cover body; and a surface of the attraction member facing the lock panel is higher than a surface of the shielding cover body facing the lock panel.

14. The door lock shielding cover of claim 10, wherein the attraction member covers a surface of the shielding cover body facing the lock panel; a portion, located at one side of the screw column, of a surface of the attraction member away from the shielding cover body is lower than another portion, located at another side of the screw column, of a surface of the attraction member away from the shielding cover body.

15. The door lock shielding cover of claim 1, wherein the attraction member is capable of being attracted to the shielding cover body through magnetic attraction.

* * * * *